United States Patent
VanBlon et al.

(10) Patent No.: US 11,196,924 B2
(45) Date of Patent: Dec. 7, 2021

(54) METHODS AND DEVICES FOR MANAGING A DUAL CAMERA MODE BASED ON IMAGE-RELATED INFORMATION

(71) Applicant: Lenovo (Singapore) Pte. Ltd., New Tech Park (SG)

(72) Inventors: Russell Speight VanBlon, Raleigh, NC (US); Nathan J. Peterson, Oxford, NC (US); John Carl Mese, Cary, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 16/722,005

(22) Filed: Dec. 20, 2019

(65) Prior Publication Data

US 2021/0195106 A1 Jun. 24, 2021

(51) Int. Cl.
*H04N 5/225* (2006.01)
*H04N 5/232* (2006.01)
*H04N 1/21* (2006.01)

(52) U.S. Cl.
CPC ....... *H04N 5/23245* (2013.01); *H04N 1/2137* (2013.01); *H04N 5/2258* (2013.01); *H04N 5/23219* (2013.01); *H04N 5/2252* (2013.01); *H04N 5/23293* (2013.01)

(58) Field of Classification Search
CPC ... H04N 5/2258; H04N 5/3415; H04N 13/293
See application file for complete search history.

(56) References Cited

U.S. PATENT DOCUMENTS

| | | | |
|---|---|---|---|
| 2003/0117501 A1* | 6/2003 | Shirakawa | H04N 5/272 348/218.1 |
| 2005/0036044 A1* | 2/2005 | Funakura | H04N 5/272 348/239 |
| 2006/0044396 A1* | 3/2006 | Miyashita | H04N 5/2258 348/207.99 |
| 2008/0084482 A1* | 4/2008 | Hansson | H04N 5/272 348/218.1 |
| 2009/0175609 A1* | 7/2009 | Tan | G03B 15/00 396/77 |
| 2012/0120186 A1* | 5/2012 | Diaz | H04N 5/2258 348/36 |
| 2012/0120273 A1* | 5/2012 | Amagai | H04N 5/247 348/222.1 |
| 2012/0218431 A1* | 8/2012 | Matsuoto | H04N 5/23219 348/218.1 |

(Continued)

*Primary Examiner* — Twyler L Haskins
*Assistant Examiner* — Dwight Alex C Tejano
(74) *Attorney, Agent, or Firm* — The Small Patent Law Group LLC; Josef L. Hoffmann (57) ABSTRACT

Methods, devices, and computer program products for managing a dual camera mode (DCM) are provided. The method obtains primary image data for a scene in a first field of view (FOV) of a first digital camera unit (DCU) and image-related information indicative of an attribute of interest (AOI) associated with the primary image data. A DCM status is determined based on the AOI. A secondary data capture operation is implemented at a second DCU based on the DCM status determined. The second DCU includes a second FOV that is different than the first FOV. The secondary data capture operation obtains secondary image data. The method manages storage of the primary image data and the secondary image data.

20 Claims, 6 Drawing Sheets

(56) References Cited

U.S. PATENT DOCUMENTS

| | | | | |
|---|---|---|---|---|
| 2014/0232743 A1* | 8/2014 | Na | ................... | H04N 5/232945 |
| | | | | 345/629 |
| 2014/0232921 A1* | 8/2014 | Kim | ................ | H04N 5/232945 |
| | | | | 348/333.05 |
| 2014/0240540 A1* | 8/2014 | Kim | ..................... | H04N 5/2258 |
| | | | | 348/231.99 |
| 2015/0181134 A1* | 6/2015 | Takahashi | ........ | H04N 5/232945 |
| | | | | 348/239 |
| 2015/0304566 A1* | 10/2015 | Seo | ......................... | G06T 11/60 |
| | | | | 348/222.1 |
| 2016/0314346 A1* | 10/2016 | Bigioi | .................. | G06K 9/4604 |
| 2016/0378788 A1* | 12/2016 | Panneer | ................. | G06K 9/209 |
| | | | | 382/118 |
| 2019/0325559 A1* | 10/2019 | Hsu | ........................... | G06T 7/13 |

* cited by examiner

Figure 6

METHODS AND DEVICES FOR MANAGING A DUAL CAMERA MODE BASED ON IMAGE-RELATED INFORMATION

FIELD

The present disclosure relates generally to methods, devices, and systems for managing a dual camera mode based on image-related information.

BACKGROUND OF THE INVENTION

It is common for smartphones, tablets, laptop computers, and other electronic devices to include a display surface and multiple cameras (e.g., digital camera units (DCUs)). For example, many electronic devices are now equipped with two cameras, one placed on a front facing surface of the electronic device, and one placed on a rear facing surface of the electronic device. A front facing camera of an electronic device may be used for taking self-portraits and for video calls, as well as other applications. A rear facing camera may be used for taking pictures and/or videos of a scene of interest to a user, as well as other applications. Front facing cameras and rear facing cameras may also simultaneously capture and present front image data and rear image data using a dual camera mode (DCM). In one example, in DCM, the front image is combined with the rear image to form a composite image. The main image (captured by the rear facing camera) may be, for example, overlaid with a sub-image (captured by the front facing camera) in a picture-in-picture (PIP) format. This may allow users to capture an event or object of interest (taken by the rear facing camera), while simultaneously capturing their own expression or reaction to the event (taken by the front facing camera).

However, DCM is a feature that users have to manually turn on or turn off, resulting in missing capture of image data at the front facing camera where it would have been valuable to the user. A user may run DCM all of the time, but doing so unnecessarily consumes device resources (e.g., processing resources, storage resources, and the like) and may result in the user having to subsequently review and manually remove unwanted image data. Accordingly, a need exists for improved methods and devices for automatically managing a dual camera mode.

SUMMARY

In accordance with embodiments herein, a method for managing a dual camera mode (DCM) is provided. The method operates under control of one or more processors configured with specific executable program instructions. The method obtains primary image data for a scene in a first field of view (FOV) of a first digital camera unit (DCU) and image-related information indicative of an attribute of interest (AOI) associated with the primary image data. A DCM status is determined based on the AOI. A secondary data capture operation is implemented at a second DCU based on the DCM status determined. The second DCU includes a second FOV that is different from the first FOV. The secondary data capture operation obtains secondary image data. The method manages storage of the primary image data and the secondary image data.

Optionally, the AOI may include one or more of an identity of a user, audio data, location data, calendar data, event data, proximity data, contact data, object recognition data, or emotion data. The method may analyze the image data and image-related information to identify one or more candidate AOI and identify one or more confirmed AOI from the one or more candidate AOI. The DCM status may be determined based on a DCM status confidence level associated with the one or more confirmed AOI exceeding a threshold confidence level. The DCM status may be implemented by implementing a DCM setting of an image application. The secondary data capture application may be implemented based on one or more of a select level of activity or a select type of activity of one or more of the user or one or more subjects in the first FOV of the first DCU. The managing may include temporarily storing the secondary image data and prompting the user to confirm permanent storage of the secondary data. The secondary image data may be managed based on one or more of a select level of activity or a select type of activity of the user. The method may include displaying the primary image data and the secondary image data together.

In accordance with embodiments herein, a device for managing a dual camera mode (DCM) based on image-related information is provided. The device includes a first digital camera unit (DCU) oriented within a housing of the device so that a sensor of the first DCU has a first field of view (FOV) and a second DCU oriented within the housing so that a sensor of the second DCU has a second FOV that is different from the first FOV. The device also includes one or more processors and a memory storing program instructions accessible by the processor. Responsive to execution of the program instructions, the one or more processors obtain primary image data for a scene in a first field of view (FOV) of a first digital camera unit (DCU) and image-related information indicative of an attribute of interest (AOI) associated with the primary image data. The one or more processors determine a DCM status based on the AOI. The one or more processors implement a secondary data capture operation at a second DCU based on the DCM status determined and obtain secondary image data. The one or more processors manage storage of the primary image data and the secondary image data.

Optionally, the AOI may include one or more of an identity of a user, audio data, location data, calendar data, event data, proximity data, contact data, object recognition data, or emotion data. The one or more processors may analyze the image data and image-related information to identify one or more candidate AOI and identify one or more confirmed AOI from the one or more candidate AOI. The one or more processors may determine the DCM status based on a DCM status confidence level associated with the one or more confirmed AOI exceeding a threshold confidence level. The one or more processors may implement a DCM setting of an image application. The one or more processors may implement the secondary data capture application based on one or more of a select level of activity or a select type of activity of one or more of the user or one or more subjects in the first FOV of the first DCU. The one or more processors may temporarily store the secondary image data and prompt the user to confirm permanent storage of the secondary data. The one or more processors may manage the secondary image data based on one or more of a select level of activity or a select type of activity of the user.

In accordance with embodiments herein, a computer program product for managing a dual camera mode (DCM) based on image-related information is provided. The computer program product includes a non-signal computer readable storage medium comprising computer executable code to obtain primary image data for a scene in a first field of view (FOV) of a first digital camera unit (DCU) and image-related information indicative of an attribute of interest (AOI) associated with the primary image data. The computer program product determines a DCM status based on the AOI. The computer program product implements a secondary data capture operation at a second DCU based on the DCM status determined and obtains secondary image data. The second DCU includes a second FOV that is different from the first FOV. The computer program product manages storage of the primary image data and the secondary image data.

Optionally, the AOI may include one or more of an identity of a user, audio data, location data, calendar data, event data, proximity data, contact data, object recognition data, or emotion data. Optionally, the computer executable code analyzes the image data and image-related information to identify one or more candidate AOI and identify one or more confirmed AOI from the one or more candidate AOI.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation.

The following description is intended only by way of example, and simply illustrates certain example embodiments.

TERMS

The term "image data" shall mean information associated with image data related to one or more of two-dimensional (2-D) images, three-dimensional (3-D) images, panoramic images, still images, and/or video images, including associated audio data.

The term "image-related information" shall mean data and information collected by the device, including location data (e.g., GPS data), calendar data, event data, proximity data (e.g., proximity to other device users or to geographic locations of interest), object recognition data, emotion data, and the like. The image-related information shall include information determined by the device based on analysis of image data, such as an identification of individuals, locations, etc., in the image data based on image recognition analysis of the image data. In one non-limiting example, proximity data may include information indicative of a distance or spacing between a user of the and a device associated with a family member (e.g., a child, a sibling, a parent), a friend, and the like. In another non-limiting example, proximity data may include information indicative of a distance or spacing between a user and a geographic location of interest (e.g., Niagara Falls, the Louvre, a party or concert venue, a home of a family member or friend). In another non-limiting example, object recognition data may include face recognition data (e.g., of a child, sibling, parent, friend, or the like), object-based location recognition data (e.g., the Eiffel Tower, the Taj Mahal, Mount Rushmore, etc.), or object-based event recognition data (e.g., party balloons, fireworks, roller coasters, etc.). In another non-limiting example, event data may include data gleaned from one or more of email (e.g., receipts for plane tickets, hotel reservation confirmation, etc.), voicemail (e.g., voicemail transcriptions mentioning parties, vacations, etc.), and calendar data.

The term "rear facing" refers to a DCU that faces away from a user when the device is oriented with the display and user interface facing the user and that captures images viewable by the user.

The term "front facing" refers to a DCU that faces towards a user when the device is oriented with the display and user interface facing the user and that captures images of the user.

The term "image attribute of interest" and "image AOI" shall mean attributes present in image-related information associated with an image capture operation that indicate one or more of a location of a user of a device, a user identity, objects and/or subjects present in a field of view (FOV) of a camera (e.g., a DCU), the emotions of one or more of the user in the FOV of the front facing DCU or the subjects in the FOV of the rear facing DCU, the relationships of the user to one or more subjects in the FOV of the rear facing DCU, and the like. By way of example, image AOI may include one or more of locations, types of objects in the FOV of the rear facing DCU, identities of objects in the FOV of the rear facing DCU, events concurrent with one or more of a location or a time of an image capture operation of the device, the proximity of the device to the devices of one or more contacts (e.g., family, friends, and the like), emotions of one or more of a user of the device or subjects in the FOV of the rear facing DCU, an identity of the user of the device, an identity of one or more subjects within the FOV of the rear facing DCU, types of emotions exhibited by one or more of the user or one or more subjects present in the FOV of the rear facing DCU, and the like. Various attributes of interest are discussed below. It is understood that variations in the following attributes of interest, or alternative attributes of interest, may be utilized in accordance with embodiments herein.

System for Managing the Dual Camera Mode

In accordance with embodiments herein, systems and methods are provided for automatically managing the dual camera mode of a device. Based on a user recording a video or taking a photo at a first DCU (e.g., a rear facing DCU), a second DCU automatically records secondary image data at a second DCU. For example, based on the user recording a video or taking a photo at a rear facing DCU, the second DCU (e.g., a forward facing DCU) records the user at the front facing camera based on detecting certain conditions, such as select emotions, select locations, and select people. For example, the dual camera mode may be automatically implemented based on detecting a parent recording images of their children and/or the parent laughing. Additionally or alternatively, the dual camera mode may be automatically implemented prior to the user recording a video or taking a photo based on detecting the user is at a select location (e.g., only at home, on vacation, at the beach) and/or in proximity to select people (e.g., in proximity to their children). The dual camera mode may record audio and/or images of the user continuously or only when the user is speaking, narrating, laughing, or smiling. Additionally or alternatively, the recording at the front facing camera may be displayed and/or stored in PIP format or separate from the images captured by the user based on the user's preferences, who the user is in proximity to, or who is viewing the images captured by the rear facing camera. For example, the recording at the front facing camera may be displayed only when the children view the images captured by the rear facing camera but not when the parent is viewing the same images. For clarity purposes, the first DCU and the second DCU are described as a rear facing DCU and a forward facing DCU. However, it should be understood that the following systems and methods include a first DCU having a first FOV and a second DCU having a second FOV that is different (e.g., that does not capture the identical FOV as the first FOV) than the first FOV. The second FOV may be spaced apart from or rotated about one or more of an x, y, and z axis with respect to the first FOV.

Figure 1:
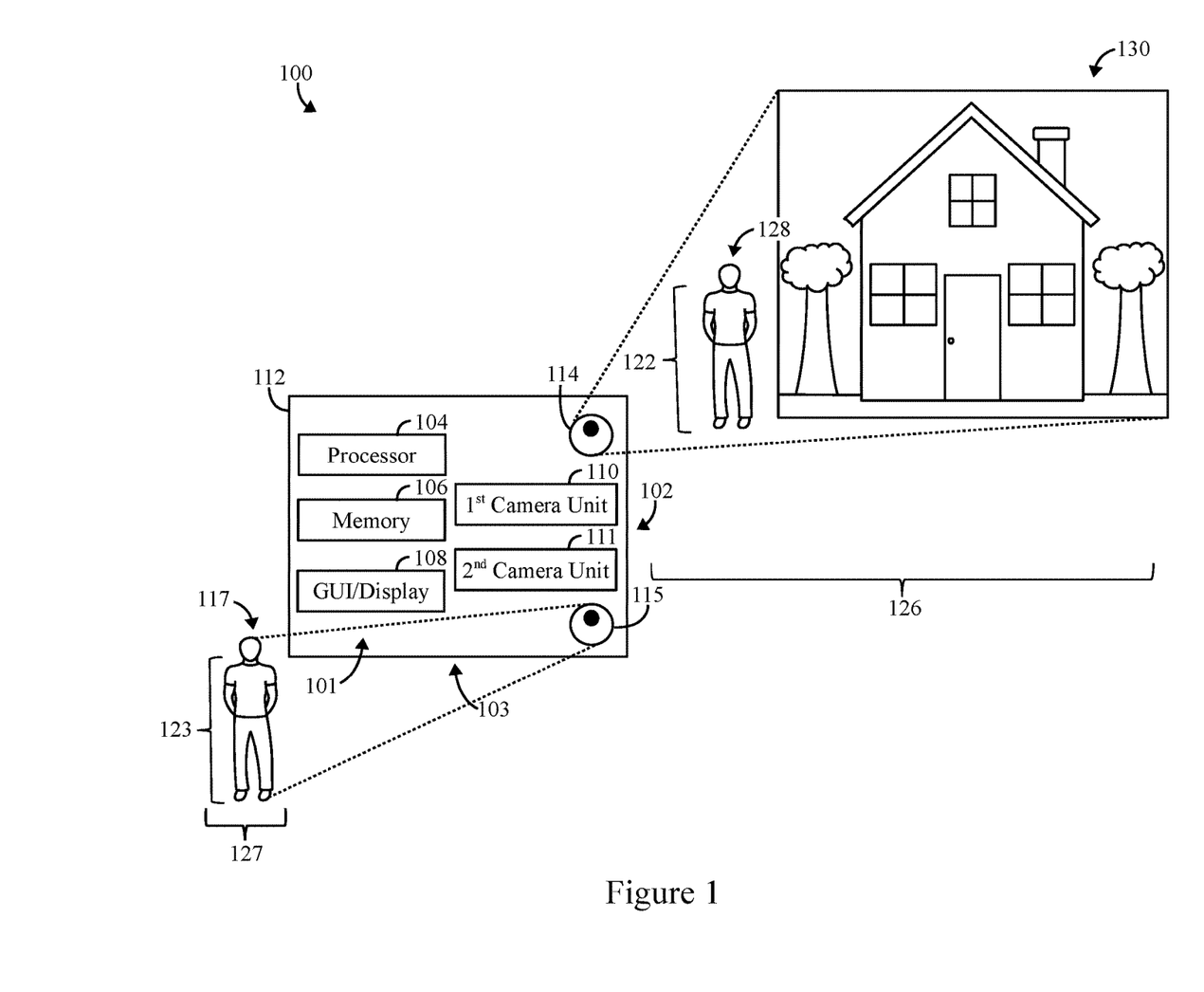
FIG. 1 illustrates an example system for managing a dual camera mode based on image-related information in accordance with embodiments herein.

FIG. 1 illustrates a system 100 for managing a dual camera mode (DCM) based on image data and image-related information in accordance with embodiments herein. The system 100 may be implemented in connection with devices having first and second DCUs and/or sensors (e.g., forward facing and rear facing DCUs and/or sensors). Embodiments herein avoid certain difficulties in using DCM, such as difficulties arising from the need to manually turn on and/or turn off the DCM setting. For example, a user accidentally forgetting to turn off DCM may unnecessarily consume resources (e.g., processing resources, storage resources, and the like) and may result in the user having to subsequently review and manually remove unwanted image data. Conversely, a user forgetting to turn on DCM may cause the user to miss capture of image data at the front facing DCU 111 where it would have been valuable to the user.

The system 100 includes a device 102 that may be stationary or portable/handheld. The device 102 includes, among other things, a processor 104, local storage medium 106, and a user interface (including a display) 108. The device 102 includes a housing 112 that holds the processor 104, local storage medium 106, user interface 108, a GPS application 120, a first DCU 110 (e.g., a rear facing DCU 110), and a second DCU 111 (e.g., a forward facing DCU 111). The housing 112 includes a display surface 101 and a back surface 103 opposite the display surface 101. In one example, the second DCU 111 (e.g., a front facing DCU 111) may be oriented within the housing so a sensor 115 (or lens) of the front facing DCU 111 faces the display surface 101. The display surface 101 includes the user interface and display. The front facing DCU 111, via the sensor 115, has a second FOV 123 and operates under control of the processor 104 in order to capture image data for a scene 127 in the second FOV 123. The first DCU 110 (e.g., a rear facing DCU 110) is oriented within the housing so a sensor 114 (or lens) of the rear facing DCU 110 faces the back surface 101 and in a direction opposite from the sensor 115 of the front facing DCU 111. The rear facing DCU 110, via the sensor 114, has a first FOV 122 and operates under control of the processor 104 in order to capture image data for a scene 126 in the FOV 122. In the example, the rear facing DCU 110 captures scenes of interest to a user of the device 117, while the front facing DCU 111 captures images including the user of the device 117.

The system 100 also includes an imaging application (IA) 124 that, among other things, manages DCM based on image data and image-related information and maintains a collection of confirmed AOIs and corresponding confidence levels of a DCM status. The IA 124 obtains image data and image-related information for a primary data capture operation. The image data includes primary image data for a scene in a FOV of the rear facing DCU and the image-related information includes metadata collected by the device 102. In one example, the primary image data includes image data obtained by the rear facing DCU 110 for a scene 126 in the FOV 122. The metadata includes one or more of an identity of a user, audio data, location data, calendar data, event data, proximity data, contact data, object recognition data, or emotion data. In one example, metadata may include one or more of location data corresponding to a home of a relative of the user 117, audio data corresponding to laughter, object recognition data corresponding to objects within the FOV (e.g., the person 128 and the house 130), and the like. The IA 124 analyzes the image data and/or the image-related information to identify one or more candidate AOI. For example, the one or more candidate AOI may include the location of the device 102 during the primary image capture operation, the identity of the user 117 of the device 102, the identity of the person 128 in the FOV 122, the identity of the house 130 in the FOV, emotion data corresponding to joy/laughter, and the like.

The IA 124 identifies one or more confirmed AOI from the one or more candidate AOI. For example, the IA 124 identifies the one or more candidate AOI that correspond to a list of confirmed AOI For example, the location of the device at a grandparent's house, the identity of the person 130, the identity of the user of the device 117 as the parent of the person 130, and the identity of the emotional state of joy/laughter individually correspond to confirmed AOI, while the house 130 itself does not correspond to a confirmed AOI. The IA 124 determines the DCM status with respect to the confirmed AOI. The DCM status indicates that a user intends for, desires, or expects the DCM setting to be implemented. The IA 124 determines the DCM status based on the DCM status confidence level associated with the one or more confirmed AOI exceeding a threshold confidence level. For example, the IA 124 may determine the DCM status confidence level (or lack thereof) for confirmed AOI based on one or more of information obtained in a learning mode of the IA 124 or based on past user behavior regarding secondary image data (e.g., implementing the DCM status or deleting secondary image data).

The IA 124 implements a secondary data capture operation at the front facing DCU 111 based on whether the DCM status corresponds to the one or more confirmed AOI. The IA 124 implements the secondary data capture operation by implementing a DCM setting of the IA 124. The secondary data capture operation obtains secondary image data. For example, the secondary data capture operation may obtain audio and/or video at the front facing DCU 111 only while the user of the device 117 exhibits a select level of or type of activity (e.g., is speaking, narrating, laughing, smiling, and the like). Additionally or alternatively, the secondary data capture operation may obtain audio/video/still images only while the user of the device 117 exhibits select emotional states (e.g., emotional states corresponding to smiling and/or laughing). The IA 124 manages storage of the primary image data and the secondary image data. The IA 124 may store the primary image data and the secondary image data as separate, but related, image data files and/or as an integrated image data file (e.g., a picture-in-picture format or the like). Additionally or alternatively, the primary image data and the secondary image data may be temporarily stored, and the IA 124 may prompt the user of the device 117 to confirm permanent storage of the secondary image data.

Additionally or alternatively, regarding playback of the primary image data and the secondary image data, the user may choose different modes and/or manners of viewing the primary image data and the secondary image data. For example, a user (e.g., the user of the device 117 or a subsequent user) may desire to only show the secondary image data alongside the primary image data based on the audience and/or individuals tagged and/or identified in the video. In a further example, a parent may desire not to view the secondary image data when watching the primary image data, but the children may desire to view the secondary image data alongside the primary image data. In an additional or alternative example, a user (e.g., the user of the device 117 or a subsequent user) may desire to only view/listen to portions of the secondary image data when the user of the device 117 is speaking or narrating and/or exhibiting an emotional state, such as smiling and/or laughing, during the primary data capture operation.

Figure 2:
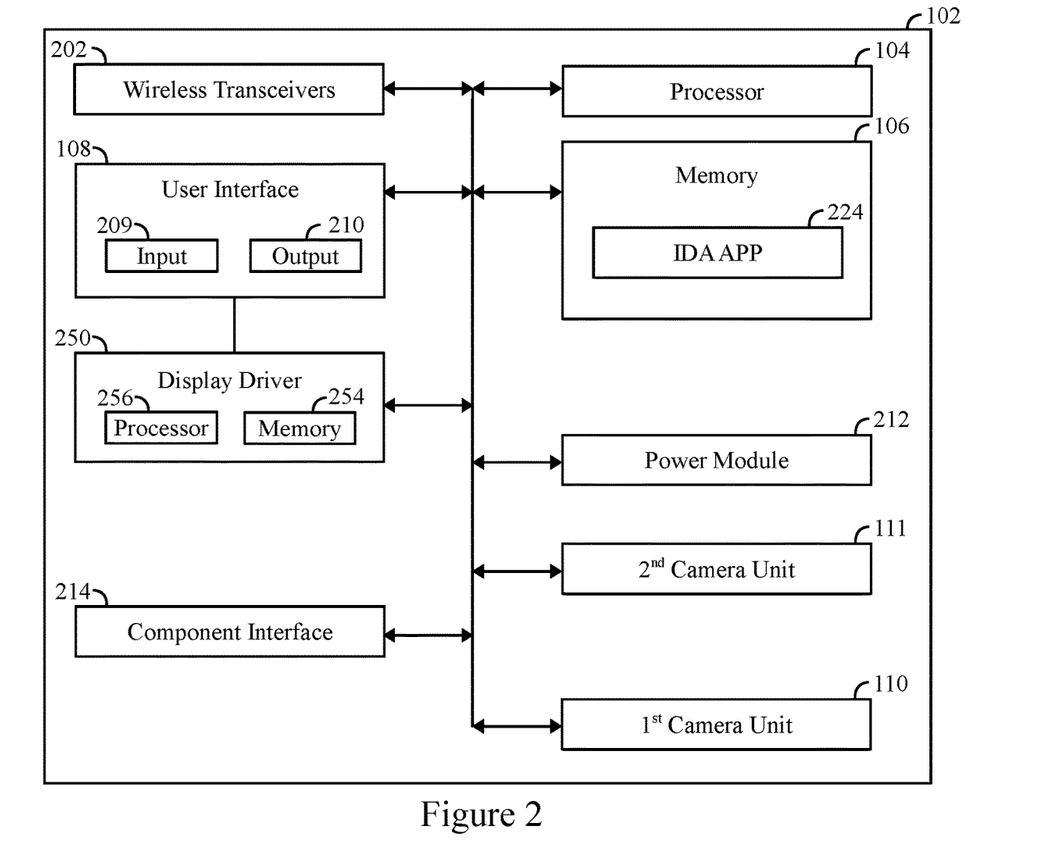
FIG. 2 illustrates an example implementation of managing a dual camera mode based on image-related information in accordance with embodiments herein.

FIG. 2 illustrates a simplified block diagram of the device 102 of FIG. 1 in accordance with an embodiment. The device 102 includes components such as one or more wireless transceivers 202, one or more processors 104 (e.g., a microprocessor, microcomputer, application-specific integrated circuit, etc.), one or more local storage medium (also referred to as a memory portion) 106, the user interface 108 which includes one or more input devices 209 and one or more output devices 210, a power module 212, and a component interface 214. The device 102 also includes the GPS application 120, the rear facing DCU 110, and the front facing DCU 111. All of these components can be operatively coupled to one another, and can be in communication with one another, by way of one or more internal communication links, such as an internal bus.

The input and output devices 209, 210 may each include a variety of visual, audio, and/or mechanical devices. For example, the input devices 209 can include a visual input device such as an optical sensor or DCU, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 210 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. The display can be operably coupled to a display driver 250. The display driver 250 may further include dedicated memory 254 and a dedicated processor 256. As further examples, the output device(s) 210 may include a touch sensitive screen, a non-touch sensitive screen, a text-only display, a smart phone display, an audio output (e.g., a speaker or headphone jack), and/or any combination thereof.

The user interface 108 permits a user (e.g., the user of the device 117) to select one or more of a switch, button or icon to collect content elements, and/or enter indicators to direct the rear facing DCU 110 and/or the front facing DCU 111 to take a photo or video (e.g., capture image data corresponding to the scene 126, 127). As another example, the user may select a content collection button on the user interface two or more successive times, thereby instructing the device 102 to capture the image data at one or more of the rear facing DCU 110 and/or the front facing DCU 111. As another example, the user may enter one or more predefined touch gestures and/or voice command through a microphone on the device 102. The predefined touch gestures and/or voice command may instruct the device 102 to collect image data for one or more scenes 126, 127 and/or a select object (e.g., the person 128 and/or the house 130 and/or the user 117) in one or more scenes 126, 127.

The local storage medium 106 may encompass one or more memory devices of any of a variety of forms (e.g., read only memory, random access memory, static random access memory, dynamic random access memory, etc.) and can be used by the processor 104 to store and retrieve data. The data that is stored by the local storage medium 106 can include, but need not be limited to, one or more operating systems, one or more applications, user collected content and informational data. The one or more operating systems include executable code that controls basic functions of the device, such as interaction among the various components, communication with external devices via the wireless transceivers 202 and/or the component interface 214, and storage and retrieval of applications and data to and from the local storage medium 106. The one or more applications include executable code that utilizes an operating system to provide more specific functionality corresponding to the communication devices, such as file system service and handling of protected and unprotected data stored in the local storage medium 106.

The applications stored in the local storage medium 106 include the IA 124 for facilitating the management and operation of the device 102 in order to allow a user to read, create, edit, delete, organize or otherwise manage the primary image data, secondary image data, the confirmed AOI, preferences for capturing and/or displaying the secondary image data, and the like. The IA 124 includes program instructions accessible by the one or more processors 104 to direct a processor 104 to implement the methods, processes and operations described herein including, but not limited to the methods, processes and operations illustrated in the Figures and described in connection with the Figures.

Additionally, the applications stored in the local storage medium include a global positioning system (GPS) application 120 to calculate the geographic coordinates of the device 102 at various times of interest, including but not limited to when the rear facing DCU 110 collects image-related information 218. The GPS application 120 includes a GPS receiver to receive GPS timing information from one or more GPS satellites that are accessible to the GPS application 120. The GPS application 120 may also include a cellular transceiver configured to utilize a cellular network when GPS satellites are not in line of sight view and/or to utilize the cellular network to improve the accuracy of the GPS coordinates. The GPS application 120 is an application that uses the Global Positioning System to determine a precise location of the device 102 to which it is attached and to record the position of the device 102 at regular intervals. The recorded geographic location data can be stored within the local storage medium 106, with the application 120, transmitted to a central location data base, or internet-connected computer, using a cellular (GPRS or SMS), radio, or satellite modem embedded in the GPS application 120. The geographic location data allows the location of the device 102 to be determined in real time using GPS tracking software. The GPS tracking software may be provided within and implemented by the GPS application 120, provided within local storage medium 106 and implemented on the processor 104), and/or provided on and implemented by a remote server.

Other applications stored in the local storage medium 106 include various application program interfaces (APIs), some of which provide links to/from, e.g., a cloud hosting service or the like. The power module 212 preferably includes a power supply, such as a battery, for providing power to the other components while enabling the device 102 to be portable, as well as circuitry providing for the battery to be recharged. The component interface 214 provides a direct connection to other devices, auxiliary components, or accessories for additional or enhanced functionality, and in particular, can include a USB port for linking to a user device with a USB cable.

Each transceiver 202 can utilize a known wireless technology for communication. Exemplary operation of the wireless transceivers 202 in conjunction with other components of the device 102 may take a variety of forms and may include, for example, operation in which, upon reception of wireless signals, the components of electronic device 102 detect communication signals and the transceiver 202 demodulates the communication signals to recover incoming information, such as voice and/or data, transmitted by the wireless signals. After receiving the incoming information from the transceiver 202, the processor 104 formats the incoming information for the one or more output devices 210. Likewise, for transmission of wireless signals, the processor 104 formats outgoing information, which may or may not be activated by the input devices 209, and conveys the outgoing information to one or more of the wireless transceivers 202 for modulation to communication signals. The wireless transceiver(s) 202 convey the modulated signals to a remote device, such as a cell tower or a remote server (not shown).

Figure 3:
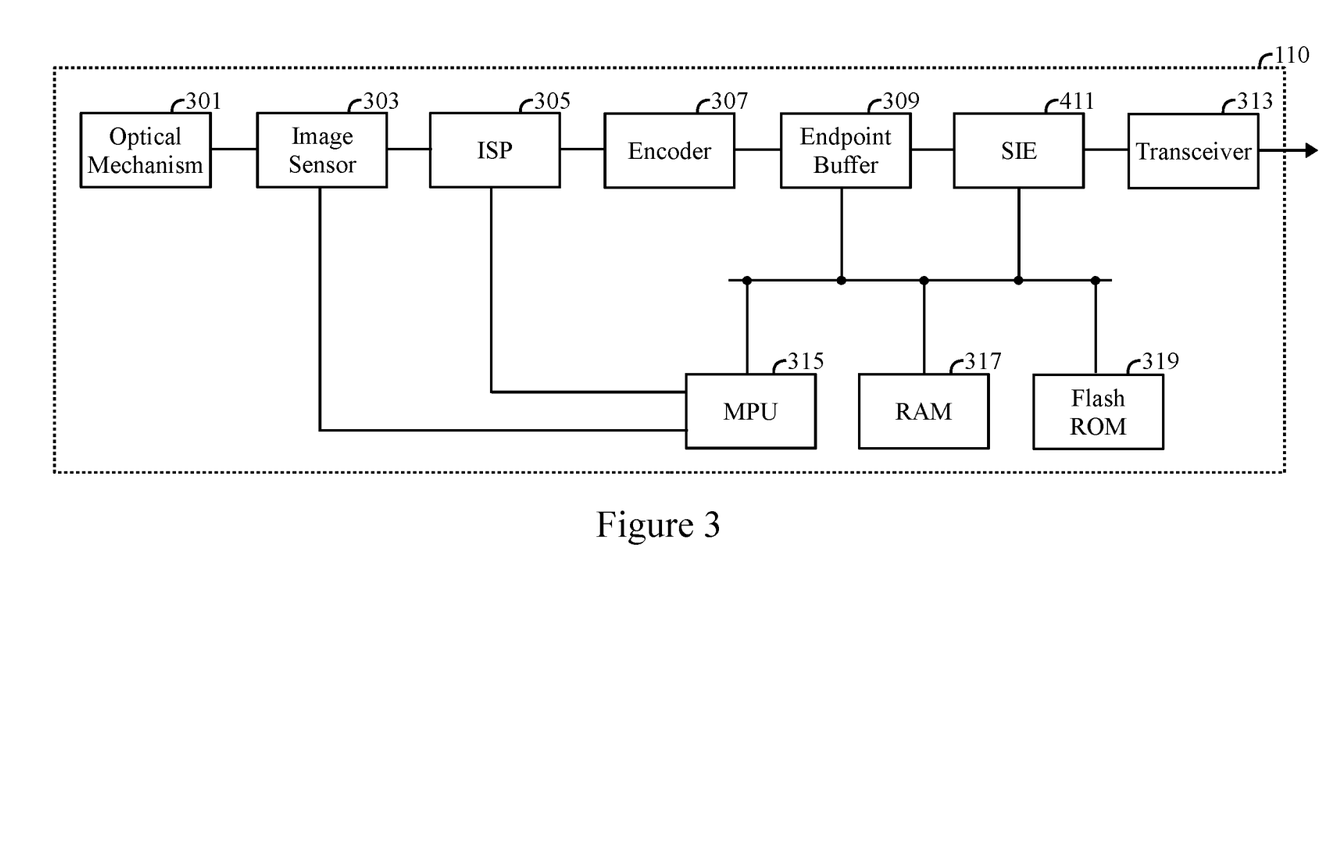
FIG. 3 illustrates a simplified block diagram of the electronic device of FIG. 1 in accordance with an embodiment.

FIG. 3 is a functional block diagram illustrating a schematic configuration of one example of a rear facing DCU 110 or a forward-facing DCU 111. The DCU 110, 111 is able to transfer VGA, QVGA, WVGA, WQVGA, and other image data and candidate image attributes of interest in the static image transfer mode. An optical mechanism 302 (corresponding to sensors 114, 115 in FIG. 1) includes an optical sensor and an optical filter and provides an image of a subject on an image sensor 304.

The image sensor 304 includes a CMOS image sensor that converts electric charges, which correspond to the amount of light accumulated in photo diodes forming pixels, to electric signals and outputs the electric signals. The image sensor 304 further includes a CDS circuit that suppresses noise, an AGC circuit that adjusts gain, an AD converter circuit that converts an analog signal to a digital signal, and the like. The image sensor 304 outputs digital signals corresponding to the image of the subject. The image sensor 304 is able to generate image data at a select frame rate (e.g., 30 fps).

The CMOS image sensor is provided with an electronic shutter referred to as a "rolling shutter." The rolling shutter controls exposure time so as to be optimal for a photographing environment with one or several lines as one block. In one frame period, or in the case of an interlace scan, the rolling shutter resets signal charges that have accumulated in the photo diodes, and which form the pixels during one field period, in the middle of photographing to control the time period during which light is accumulated corresponding to shutter speed. In the image sensor 304, a CCD image sensor may be used, instead of the CMOS image sensor.

An image signal processor (ISP) 306 is an image signal processing circuit which performs correction processing for correcting pixel defects and shading, white balance processing for correcting spectral characteristics of the image sensor 304 in tune with the human luminosity factor, interpolation processing for outputting general RGB data on the basis of signals in an RGB Bayer array, color correction processing for bringing the spectral characteristics of a color filter of the image sensor 304 close to ideal characteristics, and the like. The ISP 306 further performs contour correction processing for increasing the resolution feeling of a subject, gamma processing for correcting nonlinear input-output characteristics of the LCD, and the like. Optionally, the ISP 306 may perform the processing discussed herein to utilize additional sensed data with the image data to form image data sets. The ISP 306 may then store the image data sets in the RAM 318, flash ROM 320 and elsewhere.

Optionally, additional features may be provided within the DCU 110, 111, such as described hereafter in connection with the encoder 308, endpoint buffer 310, SIE 312, transceiver 314 and micro-processing unit (MPU) 316. Optionally, the encoder 308, endpoint buffer 310, serial interface engine (SIE) 312, transceiver 314 and MPU 316 may be omitted entirely.

In accordance with certain embodiments, an encoder 308 is provided to compress image data received from the ISP 306. An endpoint buffer 310 forms a plurality of pipes for transferring data by temporarily storing data to be transferred bidirectionally to or from the system. A SIE) 312 packetizes the image data received from the endpoint buffer 310 so as to be compatible with the USB standard and sends the packet to a transceiver 314 or analyzes the packet received from the transceiver 314 and sends a payload to an MPU 316. When the USB bus is in the idle state for a predetermined period of time or longer, the SIE 312 interrupts the MPU 316 in order to transition to a suspend state. The SIE 312 activates the suspended MPU 316 when the USB bus has resumed.

The transceiver 314 includes a transmitting transceiver and a receiving transceiver for communication (e.g., USB, MIDI, and the like). The MPU 316 runs enumeration for communication transfer and controls the operation of the DCU 110, 111 in order to perform photographing and to transfer image data. The DCU 110, 111 conform to power management prescribed in the corresponding communication standard. When being interrupted by the SIE 312, the MPU 316 halts the internal clock and then makes the rear facing DCU 110, 111 transition to the suspend state as well as itself.

When the communication bus has resumed, the MPU 316 returns the DCU 110, 111 to the power-on state or the photographing state. The MPU 316 interprets the command received from the system and controls the operations of the respective units so as to transfer the image data in the dynamic image transfer mode or the static image transfer mode. When starting the transfer of the image data in the static image transfer mode, the MPU 316 first performs the calibration of rolling shutter exposure time (exposure amount), white balance, and the gain of the AGC circuit and then acquires optimal parameter values corresponding to the photographing environment at the time, before setting the parameter values to predetermined registers of the image sensor 304 and the ISP 306.

The MPU 316 performs the calibration of exposure time by calculating the average value of luminance signals in a photometric selection area on the basis of output signals of the CMOS image sensor and adjusting the parameter values so that the calculated luminance signal coincides with a target level. The MPU 316 also adjusts the gain of the AGC circuit when calibrating the exposure time. The MPU 316 performs the calibration of white balance by adjusting the balance of an RGB signal relative to a white subject that changes according to the color temperature of the subject.

When the image data is transferred in the dynamic image transfer mode, the DCU does not transition to the suspend state during a transfer period. Therefore, the parameter values once set to registers do not disappear. In addition, when transferring the image data in the dynamic image transfer mode, the MPU 316 appropriately performs calibration even during photographing to update the parameter values of the image data.

When receiving an instruction of calibration, the MPU 316 performs calibration and sets new parameter values before an immediate data transfer and sends the parameter values to the system.

The DCU 110, 111 is a bus-powered device that operates with power supplied from the USB bus. Note that, however, the DCU 110, 111 may be a self-powered device that operates with its own power. In the case of the self-powered device, the MPU 316 controls the self-supplied power to follow the state of the USB bus 50.

Figure 4:
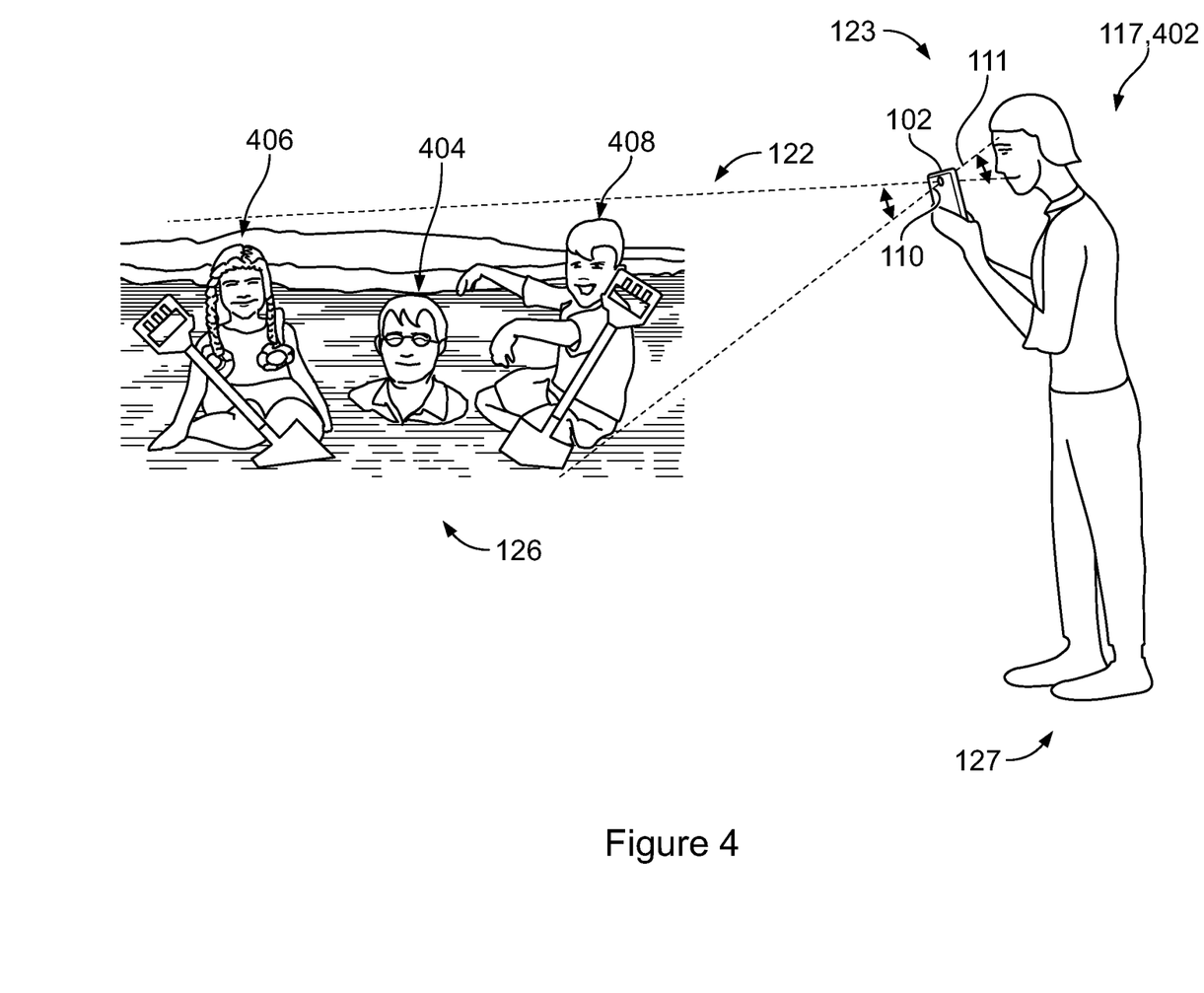
FIG. 4 illustrates a functional block diagram illustrating a schematic configuration of one example of a digital camera unit in accordance with embodiments herein.

FIG. 4 illustrates one example implementation of managing the DCM based on image-related information in accordance with embodiments herein. In operation, the user 117 (e.g., the mother 402) positions and orients the device 102 such that the lens 114 of the rear facing DCU 110 is directed toward a FOV 122 containing a scene 126. For example, the scene 126 includes a father 404, a daughter 406, and a son 408 playing at a beach location. When the lens 114 is directed toward the scene 126, the IA 124 obtains image-related information from the rear facing DCU 110, the GPS application 120, and other sources. The IA 124 also obtains primary image data related to an actual photograph and/or video recording that is or may be captured in response to the user entering a command to take the photo and/or start recording the video. Additionally or alternatively, the image-related information includes metadata. The metadata may include one or more of an identity of the user 117 of the device 102 (e.g., the mother 402), audio data, location data (e.g., GPS data indicating the beach location), calendar data (e.g., calendar or email data indicating a vacation), event data (e.g., an invitation to a destination wedding at the beach location), proximity data (e.g., proximity of the device 102 to a device associated with the father 404), contact data, object recognition data (e.g., facial recognition of the identity of the father 404, the daughter 406, the son 408 and/or object recognition of the beach location 410), emotion data (e.g., the smile/laughter of one or more of the mother 402, the father 404, the daughter 406, or the son 408), or the like. The IA 124 identifies one or more candidate AOI based on the image-related information and/or image data. The candidate AOI represent attributes associated with an image capture operation that potentially impact the desire of the user to implement the DCM setting. For example, the IA may identify the subjects 404, 406, 408, the beach location, the identity of the user 117, and/or one or more beach toys as candidate AOI. The IA 124 identifies one or more confirmed AOI from the one or more candidate AOI based on a comparison of the one or more candidate AOI to a collection of confirmed AOIs. Continuing with the example, the IA 124 identifies the father 404, the daughter 406, the son 408, the identity of the user 117 as the mother 402, the laughter and/or smiles of the user and/or one or more subjects, and the beach location 410 as corresponding to confirmed AOI but fails to identify the beach toys as a confirmed AOI. The IA 124 also identifies the confidence level for the confirmed AOIs. For example, the IA determines the DCM status by determining the DCM status confidence level of the confirmed AOIs, corresponding to the father 404, the daughter 406, and the son 408 as subjects, the mother 402 as the user, and the joyful emotional state of the user and/or the subjects, exceeds the threshold confidence level. However, the IA may determine the DCM status confidence level of the beach location to have an intermediate category for the DCM status. The intermediate category for the DCM status may indicate the DCM status might be desirable. Based on determining the DCM status for one or more confirmed AOI, the IA 124 implements the secondary data capture operation at the forward-facing DCU 111.

In accordance with embodiments herein, the IA 124 may manage the secondary data capture operation according to default and/or user-selected settings. For example, the IA 124 may obtain audio and/or video selectively based whether the user is speaking/narrating, the user or subject is laughing, a proximity of the user to specific people (e.g., children, family, friends, etc.), specific people appearing in the FOV 122 of the rear-facing DCU 110 (e.g., children). Additionally or alternatively, the IA 124 may obtain one or more of audio, video, or still images intermittently based on the user exhibiting a joyful emotional state (e.g., by smiling and/or laughing), a select location (e.g., only at home, while on vacation, while at the beach, etc.). Additionally or alternatively, the IA 124 may implement a mode for displaying and/or storing the primary and secondary image data such as displaying and/or storing the primary and secondary image data in a PIP format with respect to the first data capture operation, displaying and/or storing the primary and secondary image data separately, and the like. In an additional or alternative example, the IA 124 may implement modes for displaying and/or storing the primary and secondary image data based on the user, the proximity of the user to one or more contacts (e.g., friends and family), a parent/child relationship between the user and the subjects in the FOV of the rear-facing DCU 110, the audience viewing the primary image data (e.g., displaying the secondary image data for the children but not for the parents), or the like.

Processes for Managing the Dual Camera Mode

Figure 5:
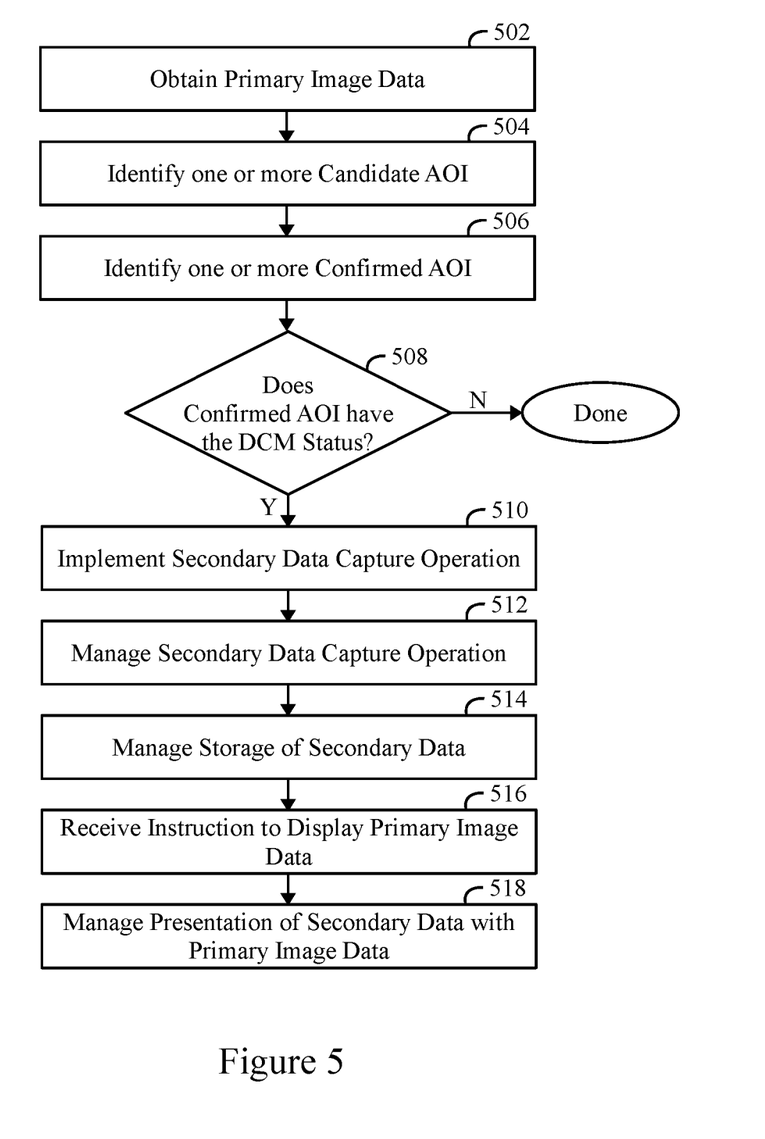
FIG. 5 illustrates an example process for managing a dual camera mode based on image-related information in accordance with embodiments herein.

FIG. 5 illustrates a process for managing a DCM based on image data and image-related information in accordance with embodiments herein. The operations of FIG. 5 are carried out by one or more processors in response to execution of program instructions, such as in the IA 124, and/or other applications stored in the local storage medium 106 and/or the main local storage medium 314. Optionally, all or a portion of the operations of FIG. 5 may be carried out without program instructions, such as in an image signal processor that has the corresponding operations implemented in silicon gates and other hardware. It should be recognized that while the operations of method 500 are described in a somewhat serial manner, one or more of the operations of method 500 may be continuous and/or performed in parallel with one another and/or other operations of the device 102.

At 502, the one or more processors obtain primary image data for a scene in the first FOV 122 of the first DCU 110 (e.g., a first DCU 110). For example, in operation, the user positions and orients the device 102 such that the lens 114 of the first DCU 110 is directed toward a scene 126 that the user desires to capture using photographs and/or videos. When the lens 114 is directed toward the scene 126, the one or more processors obtain image data from the first DCU 110. In one example, the primary image data relates to an actual photograph and/or video recording that is or may be captured in response to the user entering a command to take the photo and/or start recording the video (e.g., the scene 126 in the first FOV 122).

Additionally or alternatively, at least a portion of the primary image data may be determined based on "framing" image data collected by the first DCU 110 or the one or more processors prior to the user entering a command to capture a photo or video, such as while undergoing a framing operation of the scene 126 within the first FOV 122 of the lens 114. For example, the framing operation may occur automatically by the first DCU 110 based on the user activating the first DCU 110 (e.g., based on the user opening a "Photo" or "Video" application on the device 102). During framing, the first DCU 110 may capture a frame or repeatedly capture frames of the scene 126 periodically, such as every time the first DCU 110 performs an autofocus operation. For example, every time the first DCU 110 focuses, a "frame" may be captured. The framing image data captured during a framing operation may include the same or less content as the content obtained in a photograph and/or video. For example, the framing image data obtained during a framing operation may represent a "lower" resolution image as compared to the full resolution capability of the first DCU 110. Additionally or alternatively, the framing image data collected during a framing operation may be limited to select regions of the FOV of the lens 114. For example, the framing image data may be collected at full resolution (e.g., a common resolution as photographs), but only for a select portion of the FOV (e.g., the horizontal and vertical middle half or third of the FOV). The first DCU 110 may continuously collect primary image data while the user performs the framing operation.

At 504, the one or more processors obtain image-related information indicative of one or more candidate AOI associated with the primary image data. The one or more processors may analyze the primary image data to identify image-related information therein. Optionally, the one or more processors may analyze the image related information to identify candidate AOI. For example, the primary image data may be analyzed using image recognition and/or through a comparison to various templates, to identify individuals, locations, emotions, etc. from the primary image data. Optionally, the image-related information may be determined in various manners independent of the primary image data. For example, the image-related information may be determined from an application operating on the device (e.g., calendar app, email app, text message app, location tracking app, social media app, etc.). The candidate AOI include one or more of an identity of the user of the device 117, audio data, location data, calendar data, event data, proximity data, contact data, object recognition data, emotion data, or the like. The identity of the user 117 of the device 102 may be obtained from identification information associated with applications and/or accounts associated with the device (e.g., an Apple ID). Audio data may be obtained from an audio input device such as a microphone. Location data may be obtained from the GPS application 120 and/or based on cellular signal data, network data, or the like. Event data may be obtained from calendar applications (e.g., calendar data indicating a vacation) and/or email data (e.g., emails related to invitations, purchased tickets, reservations, and the like). Contact data may be obtained from contact applications, social media applications, and the like. Proximity data (e.g., proximity of the device 102 to a device belonging to the father 404) may be obtained from tracking applications, network data, identifying information broadcast by other devices, and the like. Object recognition data (e.g., facial recognition of the father 404, the daughter 406, the son 408 and/or object recognition of the beach 410) may be obtained by applying a machine learning and/or object recognition algorithm to the primary image data. Emotion data (e.g., the smile/laughter of one or more of the mother 402, the father 404, the daughter 406, or the son 408) may be obtained by applying a machine learning and/or emotion detection algorithm to the primary image data, analyzing audio data for signatures of laugher, and the like. The one or more processors may intermittently or continuously obtain image-related information and identify candidate AOI based on the primary image data during and subsequent to the user initiating capture of photographs and/or videos.

At 506, the one or more processors identify one or more confirmed AOI from the one or more candidate AOI. For example, the one or more processors determine the status of each of the candidate AOI by comparing the candidate AOI to a collection of template AOIs accessible by the one or more processors (e.g., stored in the local storage medium 106 or the like). A candidate AOI may be identified as a confirmed AOI based on appearing in the collection of template AOIs.

At 508, the one or more processors determine a DCM status with respect to the one or more confirmed AOI. The DCM status indicates that a user intends for, desires, or expects the DCM setting to be implemented. The one or more processors determine the DCM status based on a DCM status confidence level associated with the one or more confirmed AOI exceeding a threshold confidence level. For example, the one or more processors may determine the DCM status (or lack thereof) for confirmed AOI based on one or more of information obtained in a learning mode of the IA 124 or based on past user behavior regarding secondary image data. To determine the DCM status, the one or more processors reference the corresponding confidence level of the one or more confirmed AOI contained in the collection of confirmed AOIs and compare the corresponding confidence levels to a threshold confidence level. By way of example, the range of confidence levels may be expressed as a numeric range from 0 to 99, where 0-33 indicates the DCM status is not valuable to the user, 34-66 indicates that the DCM status may be valuable to the user, and 67-99 indicates that the DCM status is valuable to the user. In a further example, the confidence threshold may be set, either by default or by the user, to a value of 67 and include only the confirmed AOI that DCM status is known to be valuable to the user. Additionally or alternatively, the confidence threshold may be set, either by default or by the user, to a value of 34 and include the confirmed AOI that DCM status may be or is known to be valuable to the user. Based on the confidence levels of the one or more confirmed AOI falling below the threshold confidence level, the process determines that the one or more confirmed AOI do not have the DCM status. Based on the one or more confirmed AOI not having the DCM status, the process determines that implementing the DCM setting is not desirable and the process ends. Conversely, based on the DCM status confidence level of the one or more confirmed AOI exceeding the threshold confidence level, the process determines that the one or more confirmed AOI have the DCM status. Based on the one or more confirmed AOI having the DCM status, the process determines that implementing the DCM setting is desirable and flow moves to 510.

At 510, the one or more processors implement the secondary data capture operation at the second DCU 111. The one or more processors implement the secondary data capture operation by implementing a DCM setting of the IA 124 and obtaining secondary image data. By way of example, the DCM setting may be a field having an "ON" setting and an "OFF" setting and the one or more processors implement the DCM status by selecting the "ON" setting for a select duration (e.g., the duration of the primary image capture operation, the duration of the IA 124 being activated by the user, or the like).

Optionally, at 512, the one or more processors manage the secondary data capture operation based on default or user-selected settings. Managing the secondary data capture operation may include obtaining audio, video, and/or still images at the second DCU 111 continuously and/or intermittently based on a select level of activity (e.g., only while the user is active and not while the user is inactive) and/or a select type of activity (e.g., only while the user has a joyful emotional state and not otherwise) of the user. For example, managing the secondary data capture operation may include obtaining audio and/or video based on whether the user is speaking/narrating. Additionally or alternatively, managing the secondary data capture operation may include obtaining audio/video/still images intermittently based on whether the user is exhibiting a joyful emotional state by smiling and/or laughing.

The operations at 510 and 512 may be performed in parallel with the operations 502-506.

At 514, the one or more processors manage storage of the secondary data based on default or user-selected settings. The one or more processors may store the primary image data and the secondary image data as separate, but related, image data files or as an integrated image data file (e.g., in PIP format or the like). Additionally or alternatively, the one or more processors may temporarily store the secondary image data and may prompt the user to confirm permanent storage of the secondary image data. For example, based on a DCM status confidence level of 34-66, the one or more processors may prompt the user to indicate whether or not to permanently store the secondary image data. In a further example, the one or more processors may increment or decrement the DCM status confidence level based on the user indication. Additionally or alternatively, based on a DCM status confidence level of 67-99, the one or more processors may automatically permanently store the secondary image data.

Optionally, at 516 and 518, the one or more processors receive an instruction to display the primary image data and manage presentation of the primary image data and the secondary image data. The user (e.g., the user of the device 117 or subsequent user) may choose different modes and/or manners of viewing the primary image data and the secondary image data. By way of example, the user may desire to only show the secondary image data alongside the primary image data based on the audience and/or individuals tagged and/or identified in the video. For instance, a parent may desire to not view the secondary image data when viewing the primary image data, but the children or others may desire to view the secondary image data alongside the primary image data. Accordingly, the secondary image data is not displayed when the parent views the primary image data, but secondary image data is displayed with the primary image data when the children view the primary image data. In an additional or alternative example, the user may desire to only view/listen to portions of the secondary image data when the user 117 is speaking or narrating and/or exhibiting an emotional state corresponding to smiling and/or laughing. Accordingly, the secondary image data may only be stored and/or displayed based on the user speaking, smiling, laughing, or the like.

Figure 6:
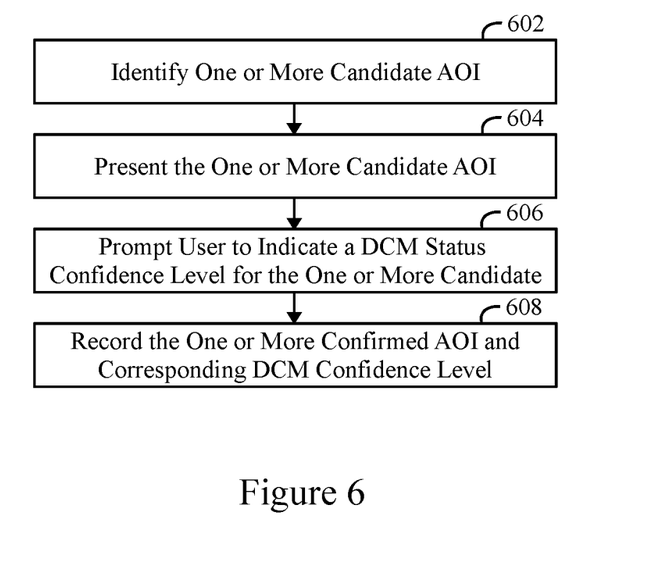
FIG. 6 illustrates an example process for determining a dual camera mode status in accordance with embodiments herein.

FIG. 6 illustrates an example process for determining the DCM status in accordance with embodiments herein. The operations of FIG. 6 are carried out by one or more processors in response to execution of program instructions, such as in the IA 124, and/or other applications stored in the local storage medium 106 and/or the main local storage medium 314. Optionally, all or a portion of the operations of FIG. 6 may be carried out without program instructions, such as in an image signal processor that has the corresponding operations implemented in silicon gates and other hardware. It should be recognized that while the operations of method 600 are described in a somewhat serial manner, one or more of the operations of method 600 may be continuous and/or performed in parallel with one another, one or more of the operations of method 500, and/or other operations of the device 102.

At 602, the one or more processors analyze image-related information previously obtained by the device 102 to identify one or more candidate AOI. The image-related information previously obtained by the device may include primary image data corresponding to one or more images accessible to the one or more processors (e.g., stored in the local storage medium 106 and the like). The image-related information may also include metadata collected by the device, including location data (e.g., GPS data) related to significant or frequent locations related to the user, calendar data related to the user, event data related to the user, proximity data (e.g., proximity to other device users in the user's contact list or to geographic locations of interest determined based on email, internet search data, etc.), object recognition data (e.g., face recognition data and the like), emotion data, and the like.

At 604 and 606, the one or more processors present a candidate AOI of the one or more candidate AOI and prompt the user to indicate whether or not the candidate AOI corresponds to the DCM status. By way of example, the one or more processors may present an image of a contact, an image of a frequent subject of video and/or still images, a frequent location, a type of emotion, or the like and prompt the user to affirmatively indicate the DCM status exists or does not exist based on the user's desire with regard to the candidate AOI. Based on the user indicating that the DCM status exits with regard to the candidate AOI, the process determines the candidate AOI to be a confirmed AOI having a confidence level corresponding to the DCM status. Based on the user indicating that the DCM status does not exist with regard to the candidate AOI, the process determines the candidate AOI to be a confirmed AOI having a confidence level that does not correspond to the DCM status. Optionally, based on the user not making an indication (e.g., skipping the candidate AOI), the process may determine the candidate AOI to be a confirmed AOI and the candidate AOI to have a confidence level indicating that DCM status may apply to the candidate AOI.

At 608, the one or more processors record the confirmed AOI and the corresponding DCM status confidence level in the collection of confirmed AOIs and corresponding confidence levels. The process 600 continues to repeat until the user terminates the process or the one or more candidate AOI are confirmed and assigned a corresponding confidence level.

CONCLUSION

Before concluding, it is to be understood that although e.g., a software application for undertaking embodiments herein may be vended with a device such as the system 100, embodiments herein apply in instances where such an application is e.g., downloaded from a server to a device over a network such as the Internet. Furthermore, embodiments herein apply in instances where e.g., such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", "one or more of A or B", and "one or more of A and B" (where "A" and "B" represent claim elements), are used to encompass i) A, ii) B and/or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method for managing a dual camera mode (DCM), the method comprising:
   under control of one or more processors configured with specific executable program instructions:
   obtaining primary image data for a scene in a first field of view (FOV) of a first digital camera unit (DCU);
   obtaining image-related information indicative of an attribute of interest (AOI) associated with the primary image data and related to a user;
   analyzing the primary image data and the image-related information to identify the AOI related to the user;
   determining a DCM status based on the AOI;
   implementing a secondary data capture operation at a second DCU to obtain secondary image data of the user based on the DCM status determined, the second DCU having a second FOV that is different from the first FOV;
   wherein implementing the secondary data capture operation at the second DCU to obtain the secondary image data of the user is based on the DCM status determined based on the AOI related to the user; and
   managing storage of the primary image data and the secondary image data.

2. The method of claim 1, wherein the AOI comprises one or more of an identity of the user, audio data, location data, calendar data, event data, proximity data, contact data, object recognition data, or emotion data.

3. The method of claim 1, wherein analyzing the image data and image-related information to identify the AOI includes identifying one or more candidate AOI and identifying one or more confirmed AOI from the one or more candidate AOI; and wherein implementing the secondary data capture operation at the second DCU to obtain the secondary image data of the user is based on the DCM status determined based on the one or more confirmed AOI.

4. The method of claim 1, wherein determining further comprises determining the DCM status based on a DCM status confidence level associated with the one or more confirmed AOI exceeding a threshold confidence level.

5. The method of claim 1, wherein the implementing further comprises implementing a DCM setting of an image application.

6. The method of claim 1, wherein the implementing further comprises implementing the secondary data capture operation based on a select level of activity of one or more subjects in the first FOV of the first DCU.

7. The method of claim 1, wherein the managing further comprises temporarily storing the secondary image data and prompting the user to confirm permanent storage of the secondary data.

8. The method of claim 1, wherein the managing further comprises managing the secondary image data based on one or more of a select level of activity or a select type of activity of the user.

9. The method of claim 1, further comprising displaying the primary image data and the secondary image data together.

10. A device for managing a dual camera mode (DCM) based on image-related information, the method comprising:
    a first digital camera unit (DCU) oriented within a housing of the device so that a sensor of the first DCU has a first field of view (FOV);
    a second DCU oriented within the housing so that a sensor of the second DCU has a second FOV that is different from the first FOV;
    one or more processors;
    a memory storing program instructions accessible by the processor, wherein, responsive to execution of the program instructions, the one or more processors perform the following:
    obtain primary image data for a scene in the first FOV of the first DCU;
    obtain image-related information indicative of an attribute of interest (AOI) associated with the primary image data and related to a user;
    analyze the primary image data and the image-related information to identify the AOI related to the user;
    determine a DCM status based on the AOI;
    implement a secondary data capture operation at the second DCU to obtain secondary image data of the user based on the DCM status determined;
    wherein to implement the secondary data capture operation at the second DCU to obtain the secondary image data of the user is based on the DCM status determined based on the AOI related to the user; and
    manage storage of the primary image data and the secondary image data.

11. The device of claim 10, wherein the AOI comprises one or more of an identity of the user, audio data, location data, calendar data, event data, proximity data, contact data, object recognition data, or emotion data.

12. The device of claim 10, wherein to analyze the image data and image-related information to identify the AOI includes identifying one or more candidate AOI and identify one or more confirmed AOI from the one or more candidate AOI; and wherein implementing the secondary data capture operation at the second DCU to obtain the secondary image data of the user is based on the DCM status determined based on the one or more confirmed AOI.

13. The device of claim 10, wherein the one or more processors, as part of the determine, determine the DCM status based on a DCM status confidence level associated with the one or more confirmed AOI exceeding a threshold confidence level.

14. The device of claim 10, wherein the one or more processors, as part of the implement, implement a DCM setting of an image application.

15. The device of claim 10, wherein the one or more processors, as part of the implement, implement the secondary data capture application based on a select level of activity of one or more subjects in the first FOV of the first DCU.

16. The device of claim 10, wherein the one or more processors, as part of the manage, temporarily store the secondary image data and prompt the user to confirm permanent storage of the secondary data.

17. The device of claim 10, wherein the one or more processors, as part of the manage, manage the secondary image data based on one or more of a select level of activity or a select type of activity of the user.

18. A computer program product for managing a dual camera mode (DCM) based on image-related information, the computer program product comprising a non-signal computer readable storage medium comprising computer executable code to:

obtain primary image data for a scene in a first field of view (FOV) of a first digital camera unit (DCU);

obtain image-related information indicative of an attribute of interest (AOI) associated with the primary image data related to a user;

analyze the primary image data and the image-related information to identify the AOI related to the user;

determine a DCM status based on the AOI;

implement a secondary data capture operation at a second DCU to obtain secondary image data of the user based on the DCM status determined the second DCU having a second FOV that is different from the first FOV;

wherein to implement the secondary data capture operation at the second DCU to obtain the secondary image data of the user is based on the DCM status determined based on the AOI related to the user; and manage storage of the primary image data and the secondary image data.

19. The device of claim 18, wherein the AOI comprises one or more of an identity of the user, audio data, location data, calendar data, event data, proximity data, contact data, object recognition data, or emotion data.

20. The device of claim 19, wherein to analyze the image data and the image-related information includes identifying one or more candidate AOI and identifying one or more confirmed AOI from the one or more candidate AOI; and wherein implementing the secondary data capture operation at the second DCU to obtain the secondary image data of the user is based on the DCM status determined based on the one or more confirmed AOI.

* * * * *